UNITED STATES PATENT OFFICE.

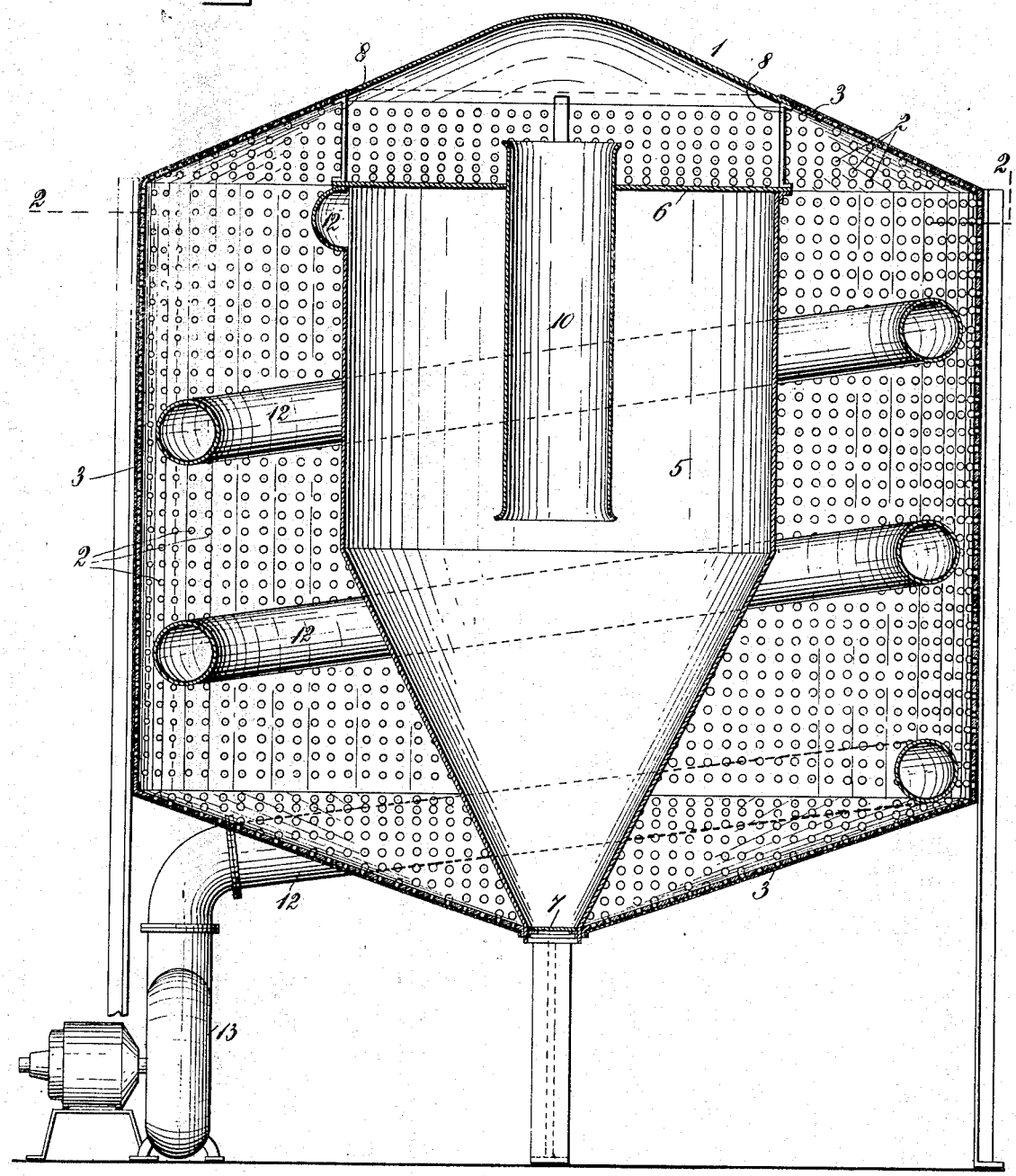

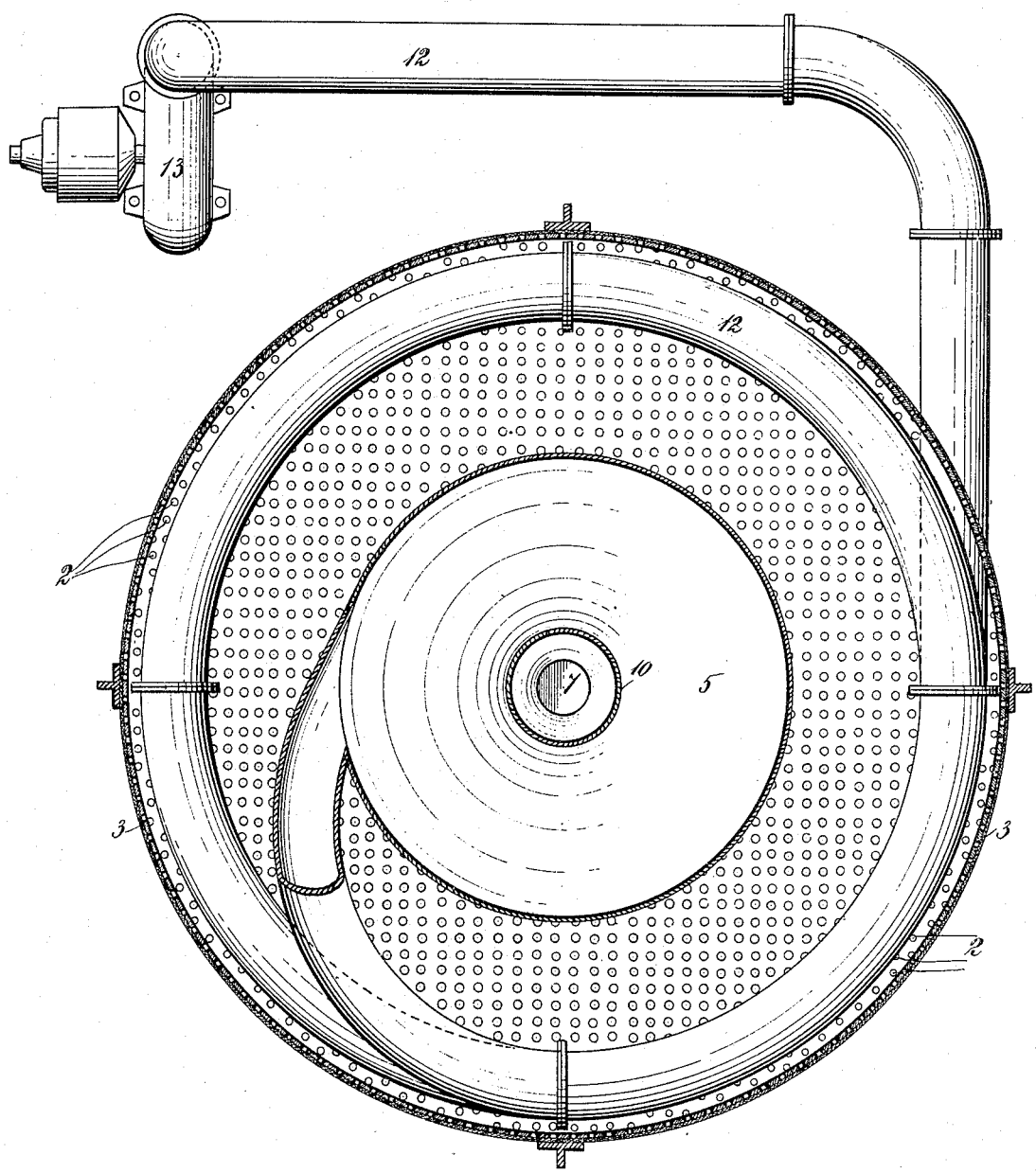

JOHN WALKER, OF BOSTON, MASSACHUSETTS, ASSIGNOR TO MASSACHUSETTS CHOCOLATE COMPANY, OF BOSTON, MASSACHUSETTS, A CORPORATION OF MASSACHUSETTS.

APPARATUS FOR TREATING COCOA AND OTHER PULVERULENT MATERIAL.

1,226,831.   Specification of Letters Patent.   Patented May 22, 1917.

Application filed August 27, 1915. Serial No. 47,594.

*To all whom it may concern:*

Be it known that I, JOHN WALKER, of Boston, in the county of Suffolk and State of Massachusetts, a citizen of the United States, have invented a new and useful Improvement in Apparatus for Treating Cocoa and other Pulverulent Material, of which the following is a full, clear, and exact description, reference being had to the accompanying drawings, forming a part of this specification, in explaining its nature.

The present invention relates to an apparatus for treating cocoa in the making of cocoa powder, and also for treating other substances of pulverulent character. The apparatus is designed essentially for treating cocoa according to the process described in my co-pending application for Letters Patent of the United States, Serial No. 839,160 filed May 16, 1914. This process is one pertaining to the setting of the color in the making of the cocoa powder and one also pertaining to the pulverizing or refining of the cocoa dust. In accordance with that process the cocoa powder is taken up into a current of air and while in a state of suspension therein passes through a pipe or series of pipes, the air acting to set the color of the cocoa suspended therein and the passage of the cocoa powder through the pipes and fans for inducing the draft of air operating to reduce the powder to a remarkable degree of fineness. While the present apparatus is essentially designed for carrying out said process yet it is useful also in the refining or reduction of other material of a pulverulent character, or such as is capable of being taken up in a current of air and pass through a pipe of considerable extension, or through a series of pipes, as may be required. Such a process as I have referred to, and for that matter any process designed to effect the reduction of pulverulent material by the suspension and conveyance thereof in a draft or current of air through pipes must of necessity employ pipes of relatively large size and extension. There are required also hoppers or auxiliary receptacles for collecting the material and for effecting a separation thereof; also for relieving pressure of air by which the material may pass out of the hopper or receptacle practically relieved of pressure which would otherwise cause great inconvenience in handling.

The essential object of my invention is to provide an apparatus in which there may be employed as sufficiently large and long extent of pipe as may be necessary, also such auxiliary hoppers or receptacles as are necessary and still occupy the smallest possible space.

The apparatus can best be seen and understood by reference to the drawings, in which—

Figure 1 shows the apparatus in vertical cross section, a portion thereof being shown in side elevation.

Fig. 2 is a plan.

Referring to the drawings—1 represents an outer receptacle having preferably a generally cylindrical form with convexed top and bottom walls. The receptacle is made of sheet metal and is of some considerable size. It is also a closed receptacle excepting for vent holes or openings 2 through the walls thereof. In practice I prefer to honeycomb the side and bottom walls of the receptacle and also a portion of the top wall with these vent holes or openings. That portion of the receptacle having the openings 2 therein is entirely covered with cloth or other dust covering 3 which will permit of the passage of air through it but which will confine the dust or other material that may be within the chamber of the receptacle.

Within the outer receptacle is contained an inner receptacle or hopper 5. This hopper comprises a cylindrical body, the upper end of which is closed by a head 6 and the lower portion of which is convergent to form an outlet or mouth 7 which opens through the lower wall of the outer receptacle into such other receptacle (not shown) as may be placed beneath the hopper to receive its content. The hopper is supported at the top by means of braces 8 which connect with the head of the hopper and are secured to the top wall of the receptacle, in which connection it will be observed that the top wall of the hopper is spaced some little distance away from the top wall of the outer receptacle. At the bottom of the hopper the converging wall thereof unites with the opening through the bottom wall of the outer receptacle around the mouth of the hopper. The hopper is further provided with an opening in the head 6 thereof with a pipe section 10 extending through this opening and projecting well down into the chamber of the hopper. This pipe section provides an opening from about the center of the chamber of the hopper through the head thereof into the chamber of the outer receptacle.

Extending into the chamber of the outer receptacle is a pipe 12 which after it enters the chamber is coiled spirally around the hopper and connects with the side wall of the hopper at a point adjacent its head. As may be noted by reference to Fig. 2 this pipe connects tangentially with the hopper so that as a current of air is passed through the pipe it will enter the chamber of the hopper in such manner as to develop a cyclonic action within it. A current of air with the material therein to be treated is induced to pass through the pipe 12 and into the chamber of the hopper by a fan 13 at the inlet end of the pipe and with which the pipe connects.

In the operation of the device the material to be treated is drawn in by the fan and passed through the pipe 12 into the chamber of the hopper in a current of air developed by the fan. During its passage through the fan and through the pipe the material to be treated will be subjected to an attritive influence by the engagement of the particles with the operating parts of the fan and also by their rubbing against the wall of the pipe and against one another. After entering the chamber of the fan the cyclonic action takes place which tends to separate the material so that it may pass through the outlet of the hopper. At the same time the pressure is relieved within the chamber of the hopper through the pipe section 10 into the chamber of the outer receptacle in which practically an atmospheric pressure is maintained at all times owing to the vent openings in the wall of this receptacle which permits of the free passage of air but acts to confine within the chamber of the outer receptacle any of the material which may have passed into the chamber of the outer receptacle during the relief of the pressure. In practice, however, it is found that very little dust will escape from the hopper, a sufficient separation taking place within the hopper to insure that practically all of the material to be treated will pass out through its outlet.

From the above it will be seen that there is thus provided a very efficient working apparatus in a comparatively small space. In fact with an outer receptacle eight to nine feet in diameter one is enabled to employ an eight inch pipe some eighty feet in length, and with the chamber of the hopper and that of the outer receptacle into which the pressure is relieved sufficiently large for all practical purposes.

Having thus fully described my invention, I claim and desire to secure by Letters Patent of the United States:

1. An apparatus of the character specified comprising a centrifugal separator, a pipe of considerable extension and diameter coiled about said separator and connections therewith, and means for inducing a current of air with material therein to be treated to pass through said pipe and afterward develop a cyclonic action within said separator, said pipe and associated parts being adapted whereby as the air passes through said pipe the material therein may be subjected to attritive influence through contact with the wall of said pipe.

2. An apparatus of the character specified comprising a centrifugal separator, a receptacle outside said separator and connecting therewith to form a pressure relief chamber for said separator between it and the wall of said outer receptacle, a pipe of considerable extension and diameter extending from without said outer receptacle and coiled within said chamber about said separator, said pipe connecting with the separator, and means for inducing a current of air with material therein to be treated to pass through said pipe and afterward develop a cyclonic action within said separator, said pipe and associated parts being adapted whereby as the air passes through said pipe the material therein may be subjected to attritive influence through contact with the wall of said pipe.

JOHN WALKER.